United States Patent [19]

Misek

[11] 4,079,246

[45] Mar. 14, 1978

[54] OPTICAL COMMUNICATIONS FORWARDS SCATTER COMPENSATOR

[75] Inventor: Victor A. Misek, Hudson, N.H.

[73] Assignee: Sanders Associates, Inc., Nashua, N.H.

[21] Appl. No.: 721,634

[22] Filed: Sep. 8, 1976

[51] Int. Cl.² .............................................. H04B 9/00
[52] U.S. Cl. ....................................... 250/199; 325/39
[58] Field of Search ..................... 250/199; 325/39, 40, 325/56, 305, 365, 367, 476

[56] References Cited

U.S. PATENT DOCUMENTS

| 3,681,695 | 8/1972 | Cease et al. | 325/476 |
| 3,731,103 | 5/1973 | O'Meara | 250/199 |

*Primary Examiner*—Richard Murray
*Attorney, Agent, or Firm*—Louis Etlinger; Robert K. Tendler

[57] ABSTRACT

Pulse stretching and smearing due to forward scatter of a collimated beam from a light source is eliminated by the use of a multiple field of view detector which divides up the beam in the vicinity of the receiver into segments along the optical path of the beam, inverts the order of the signals from the segments, and delays the signals by predetermined amounts such that pulses from different segments overlap and add, with the delay set to compensate for different path lengths between the transmitter and the receiver due to the intercepting of various segments along the optical path by the fields of view of the individual detectors making up the multiple field of view receiver.

11 Claims, 7 Drawing Figures

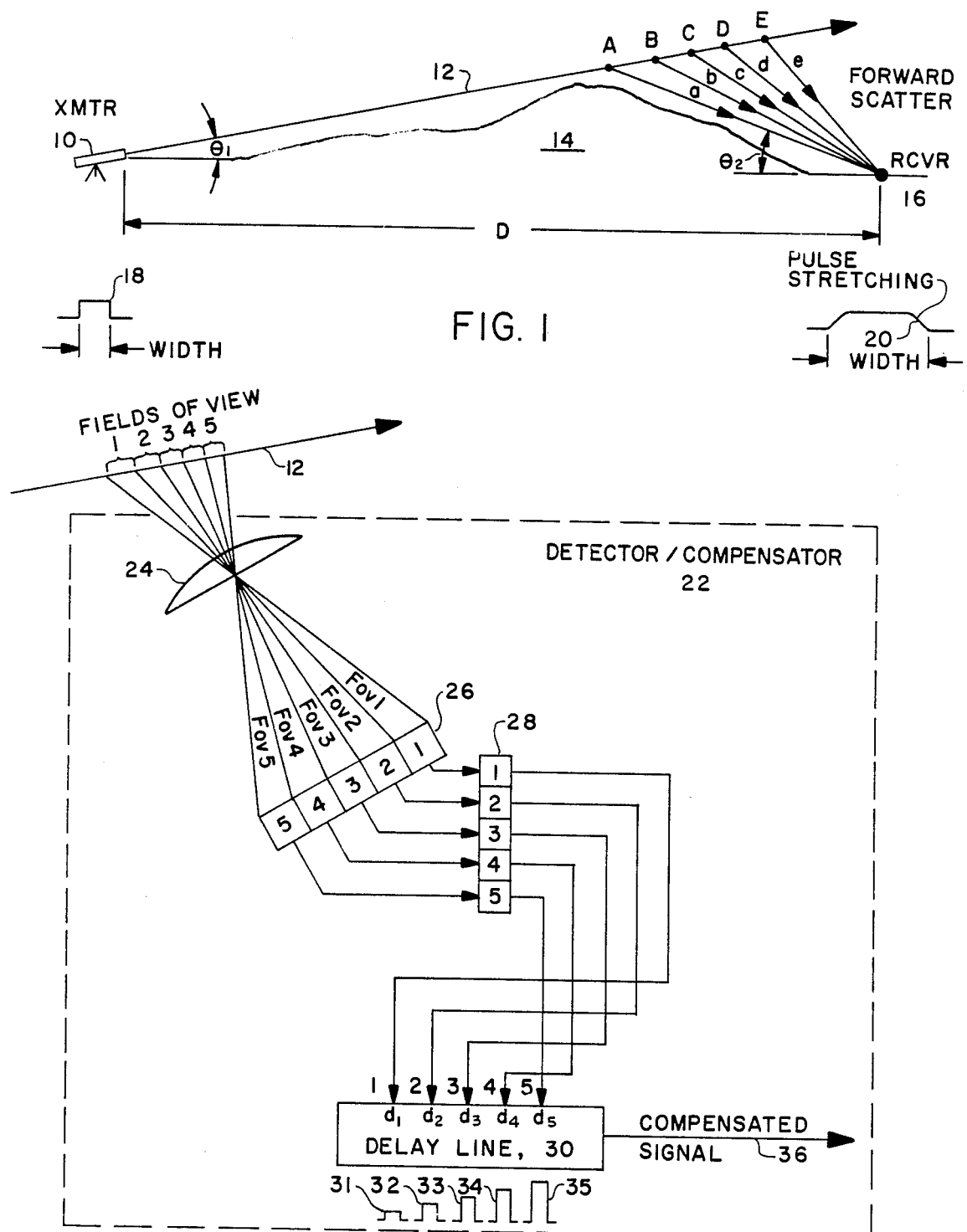

OPTICAL COMMUNICATIONS FORWARDS SCATTER COMPENSATOR

FIELD OF THE INVENTION

This invention relates to forward scatter optical communications and more particularly to a method and apparatus for eliminating the effects of the differing length optical paths between the transmitter and the receiver.

BACKGROUND OF THE INVENTION

Current optical communications and communicators include line-of-sight communication systems in which modulated laser beams generated at one point are detected at a distant point, with the information carried on the modulated beam being decoded at the receiver location. In general, line-of-sight optical communication systems provide for wide band communications and, in general, are capable of carrying more information than conventional land line systems. However, such line-of-sight communication systems are typically utilized where there is either flat terrain and no structures interposed between the transmitter and the receiver, or in situations in which both the transmitter and the receiver are located well above the existing terrain. In general, the systems are, of course, horizon limited and, therefore, have a natural limitation to a range of approximately 20 miles.

While over-the-horizon radar has been developed which operates in a forward scatter mode, considerable problems exist with microwave forward scatter due to the frequency range in which these forward scatter systems operate and, indeed, to the overcrowding of the microwave bands. Moreover, the bandwidth of coherent optical communications systems exceeds that of microwave systems by an order of magnitude. There exists, therefore, a need for over-the-horizon optical communications systems operating in a forward scatter mode to make available the increased bandwidth at the optical frequencies. It will be appreciated that land lines have limited bandwidth typically on the order of 5KHz and that the cost of laying fiber optic cable is in most instances, prohibitive. Moreover, with the aforementioned line-of-sight optical communication systems, forward scatter is minimized so as to maintain an optimum signal-to-noise ratio.

Optical forward scatter communications have, in the past, been plagued by pulse stretching and smearing with the resultant bandwidth reduction, because scatter along the beam from many points to the receiver results in different path lengths between the transmitter and the receiver. Thus, different parts of a given pulse reach the receiver at different times, and this distorts the waveshape of the transmitted pulse, thereby destroying the information carrying capability of the communications link.

Scattering arises because of aerosols and particulate matter in the earth's atmosphere which results in the redirection of the collimated beam. Scattering typically occurs over 360° and, therefore, it is possible for light scattered from one particle along the transmitted beam to arrive at the receiver with one path length while another particle, removed as much as 10,000 yards from the first point may scatter energy back to the receiver with a different path length and, thus, a different time of arrival. It is therefore possible, in a typical situation, to have a difference in arrival time of the same pulse on the order of dozens of microseconds. This results in the aforementioned smearing of the pulse such that it may overlap adjacent pulses and, thus, the interpulse spacing must be quite large in order to resolve the individual pulses. This, of course, considerably slows the data rate.

The subject system compensates for the smearing or pulse stretching which naturally occurs in the forward scatter of an optical beam by, in effect, dividing up the beam in the vicinity of the receiver into segments along the optical beam path. This is accomplished by utilizing a multiple field of view receiver having a number of detectors oriented parallel to the transmitted beam. The order of the signals from these detectors is inverted and the signals are then delayed by a suitable tapped delay line, such that the pulses from different segments exactly overlap and add. The delay from one signal to the next is set to compensate for different path lengths between the receiver and the transmitter such that pulse stretching or smearing is virtually eliminated.

Thus, in effect, the optical signal is segmented and reconstructed or reassembled with appropriate time delays which are the inverse of the delays encountered due to the difference in the optical path lengths. By virtue of the elimination of the pulse stretching or smearing, the subject system is capable of bandwidths of 10 MHz which makes the subject optical communication system suitable for video, telephony, FAX, and computer data transmission.

Another feature of the subject invention is one of noise rejection. With the subject optical path length compensator, an improved signal-to-noise ratio is achieved because noise will not exactly add at the various taps of the delay line, whereas the individual pulses which make up the communicated information will exactly add. Thus, while it is possible to get $n \times$ the signal at one detector for the pulses, the effective amplitude of the noise is $\sqrt{n}$. The noise referred to is front end detector noise or noise generated by solar background.

With suitable and currently available high powered lasers, it is now possible to obtain forward scatter communications not only over and about obstacles in the straight line path, but also over distances of 100 miles or more. Because of the noise rejection feature of the subject system, solar radiation is not a problem and the subject system is operable both in the daytime, as well as night.

It is therefore an object of this invention to provide a forward scatter optical communication system in which path length distortion is eliminated.

It is another object of this invention to provide a method and apparatus for eliminating path length distortion in forward scatter optical communication systems while at the same time affording a certain measure of noise rejection.

It is a still further object of this invention to provide long range optical communication in which the bandwidth is optimized.

These and other objects of the invention will be better understood in connection with the detail description taken in conjunction with the following drawings.

BRIEF DESCRIPTION OF THE DRAWINGS

FIG. 1 is a diagramatic representation of forward scatter optical communications indicating the differential path length problem;

FIG. 2 is a block and schematic diagram of one embodiment of the subject invention in which a multi-segment receiver is coupled to a suitable delay line to compensate for multi-path distortion;

DETAILED DESCRIPTION

Figure 3:
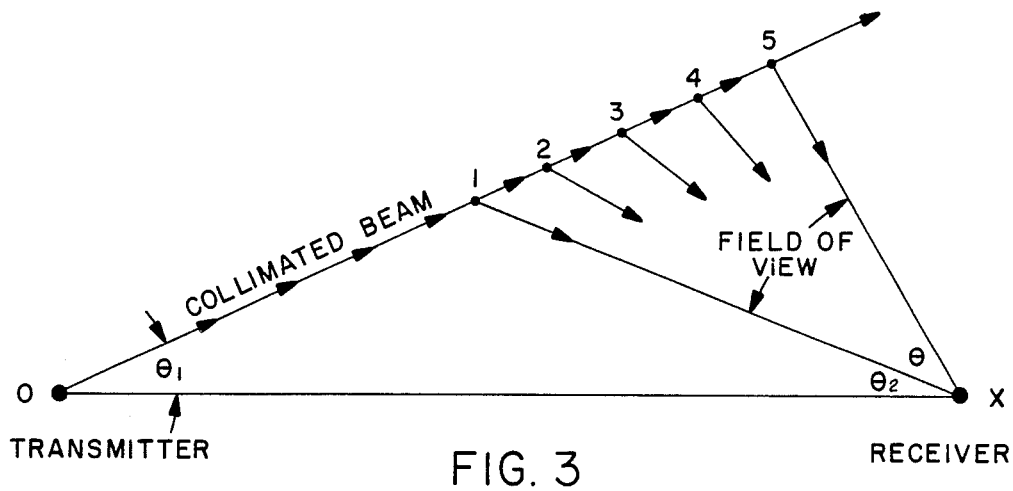
FIGS. 3, 4, and 5 are optical diagrams useful in describing the multi-path distortion problem.

As mentioned hereinbefore, the subject system involves compensating for pulse stretching or smearing which occurs in a forward scatter optical communications link. The effect of optical pulses arriving over multiple paths is to reduce the transmission bandwidth and to distort the wave shape of the transmitted pulse thereby destroying the information carrying capacity of the communications link. Typically, as illustrated in FIG. 1, a modulated transmitter 10, such as a high power laser, is aimed at an angle $\theta_1$ above the horizontal. The transmitter produces a collimated beam 12 which is at a elevation sufficient to clear any local obstacle such as mountains, trees, buildings etc. generally illustrated at 14. A receiver 16 is spaced from transmitter 10 by a distance D as illustrated, and, in general, detects radiation from points A, B, C, D, and E which is scattered by particles or aerosols at these points along beam 12 to the receiver. As illustrated, the minimum angle between the receiver and a point on the beam (A in this case) is illustrated by $\theta_2$. Also, as illustrated in FIG. 1, the path length between points A-E are illustrated by reference characters $a$ - $e$, and as illustrated, the length of the paths vary.

Because of the differential in path length, a pulse generally indicated by reference character 18 may be stretched as illustrated at 20 due to the multi-path distortion.

Referring to FIG. 2, an inverse optical delay which functions as both a detector and compensator for the signal from transmitter 10 is illustrated within dotted box 22. In this system, focusing optics 24 focus a portion of beam 12 onto a bank of detectors 26 oriented effectively parallel to the beam. Each of the detectors has an aperture resulting in a field of view (FOV) which, when projected through the focusing optics, results in the fields of view 1, 2, 3, 4, and 5 along beam 12.

Detectors 26 are coupled to corresponding preamplifiers 28 which are, in turn, coupled to a tapped delay line 30 with delays $d_1$, $d_2$, $d_3$, and $d_4$ set between detectors 1, 2; 2, 3; 3, 4; and 4, 5 respectively. The amount of delay between successive taps on the delay line is critical in order to obtain coherent addition between the signals applied to the delay line and is determined by system parameters such as the total field of view and the resolution of the system. In general, the delay line is set such that a pulse 31 from the first of the detectors overlaps a pulse 32 from the second of the detectors which in turn overlaps a pulse 33 from the third detector etc. The delay line, in effect, acts to coherently sum the pulses. The relative amplitudes of the pulses 31 through 35 are illustrated. The output signal from delay line is available on output line 36 and represents the input signal compensated for the variable path lengths.

This system is thus quite different from time slot interchange systems, such as those illustrated in U.S. Pat. Nos. 3,849,604, issued to Bines et al. on Nov. 19, 1974; or 3,838,278, issued to Dugway et al on Sept. 24, 1974, in which the signals are not delayed so that the signals overlap for coherent addition. Nor is the subject system similar to that shown in U.S. Pat. No. 3,717,769 issued to Hubbard et al. on Feb. 20, 1973, since an electrical filter is used to cancel the distortion and since no multi-aperture detection is used.

It will be appreciated that the delay line preamplifiers and detectors may take on any of a variety of forms some of which will be discussed hereinafter. As will be seen, it is possible to achieve ranges in excess of 20 miles with a 1.06 micron laser elevated at an angle of 10° above the horizontal with a minimum receiver elevation $\theta_2 = 10°$. This system can operate at a data rate 9 million bits per second corresponding to a $0.11\mu$ sec. delay between individual segments. It will be further appreciated that any collimated source may be utilized and 1.06 microns is one of many wavelengths at which atmospheric absorption is minimized. As to the detectors, an array of PIN silicon detectors may be utilized, with small demarcation intervals between the detectors produced by scribing. Alternatively, an array of fiber optic light pipes may be utilized at detector locations 1-5, with the detectors removed from the focal plane of the focusing system.

For high resolution, 0.10 microsecond delays may be utilized which correspond to 50 foot beam segments at the 10° elevations over 20 miles. In this case, the segments occupy 0.62°. For a ten nanosecond delay per segment, the field of view angle for each segment is approximately 0.062°. Note that 30 nanosecond pulses can currently be produced by modulated laser sources.

Figure 4:
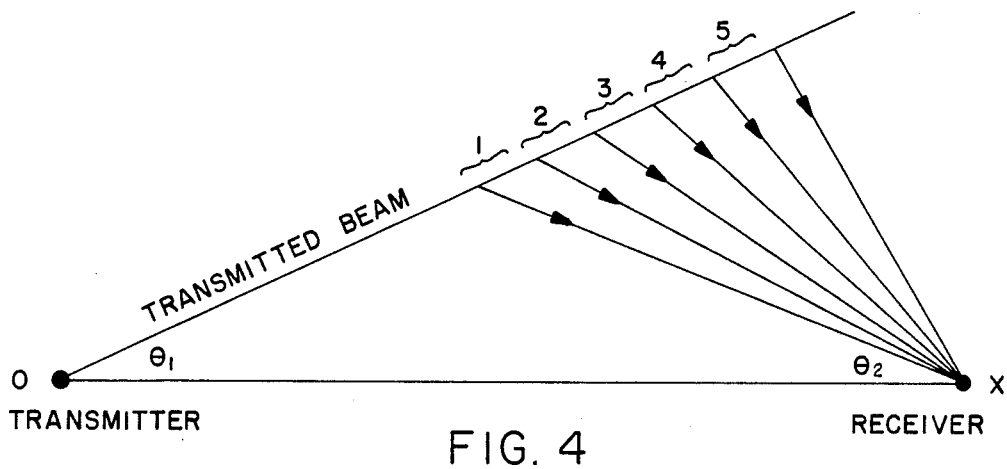
Figure 5:
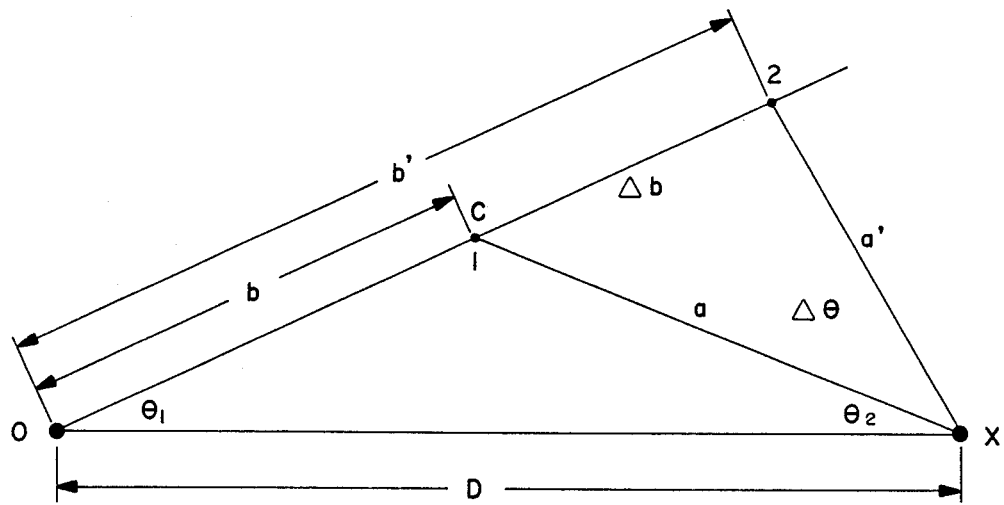

Referring now to FIGS. 3-5, the effects of multi-path forward scatter are illustrated. The transmitted radiation is assumed to be collimated into a narrow beam along path 0-5 raised at an angle $\theta_1$ above the horizontal. The transmitted signal can be assumed, for purposes of example, to be a very narrow pulse, spacially shorter than the distance between points 1, 2, 3, 4, and 5 along path 0-5. The receiver has a field of view, $\theta$, whose bottom edge is elevated at an angle $\theta_2$ with respect to the horizontal. The transmitted signal arrives at the receiver by side scatter from points on the transmitted beam path within the field of view of the receivers such as points 1, 2, 3, 4, and 5 in FIG. 3. As the transmitted pulse travels from point 1 to point 5 it continuously scatters energy into the receiver. In effect, as the pulse traverses the field of view, the effective transmit-receive path length is continuously changing, starting as O-1-X at the lower edge of the field of view, then O-2-X, O-3-X, etc., then O-5-X at the upper edge of the field of view. Because the path length is continuously increasing, the effective length of the received pulse is stretched in time by the path length difference between O-1-X and O-5-X. This will be shown to involve large scale effects.

The time delay distortion added to a pulsed signal or other wideband signal wave shape by this multi-path condition can be compensated for by utilizing the inverse optical path delay described hereinbefore. This method is shown in FIG. 4, with the receiver field of view divided such that each incremental field of view looks at only a small segment of the transmitter beam.

The amount of subdivision in the receiver field of view is determined by the extent of multi-path correction desired on the transmitted signal. A high degree of correlation requires greater subdivision. In this example, a five field of view subdivision system is utilized to provide a pulse correction factor of five. The pulse correction factor is given by the following formula:

$$P_c = \frac{\text{length of received pulse before correction}}{\text{length of corrected pulse}} \quad \text{(Equ. 1)}$$

Each incremental field of view 1, 2, 3, 4, and 5 is supplied with a separate detector preamplifier such as illustrated at FIG. 2. The receiver and inverse optical path delay compensation is illustrated in FIG. 5.

Turning now to FIG. 5, the short transmitted pulse enters $FOV_1$ first, then $FOV_2$, etc., then finally $FOV_5$. The delay between the incremental field of views may be readily calculated and the inverse optical path compensation is set up as follows: the delay between input 1 and input 2 of the delay line is set to equal the delay between $FOV_1$ and $FOV_2$. The rest of the delays are adjusted in the same manner to equal the delays between adjacent fields of view and the apparatus functions as follows:

Transmitted signal enters field of view 1 and is detected, amplified, and applied to the delay line as illustrated in FIG. 2. The transmitted signal then enters field of view 2 and, as in the case of field of view 1, is applied to the delay line. At the instant the $FOV_2$ signal is applied, the $FOV_1$ signal is located in the same portion of the delay line as that being fed by the $FOV_2$ signal. These signals are linearly summed at this position. The signal then arrives in the field of view 3 and is then fed into tap 3 of the delay line to be linearly summed with the $FOV_1$ and $FOV_2$ signals etc. The output of the delay line is the summation of the $FOV_1$ - $FOV_5$ signals superimposed in time.

The noise in the five channel on the other hand is mutually independent and adds incoherently. The improvement in signal-to-noise ratio (SNR) over that in a single field of view channel is (for equal signals in each field of view subdivision) $SNR_C = \sqrt{n}\ SNR_0$ where $SNR_C$ is the post compensation SNR; $SNR_0$ is the single channel SNR, and $n$ is the number of field of view subdivisions.

The calculation of differential delays required between field of view subdivisions may be made with reference to FIG. 5. Referring to FIG. 5, $a$, $a'$ are the center lines of field of view 1 and field of view 2. The differential path length, $\Delta L$, is given by:

$$\Delta L = a' + b' - a - b \quad \text{Equ. 2}$$

$$a = b \cos(180 - \theta_1 - \theta_2) + D \cos \theta_2 \quad \text{Equ. 3}$$

$$a = \frac{D \sin \theta_1}{\sin(180 - \theta_1 - \theta_2)} \quad \text{(Equ. 4)}$$

$$b = \frac{D \sin \theta_2}{\sin(180 - \theta_1 - \theta_2)} \quad \text{(Equ. 5)}$$

$$a' - a = \frac{D \sin \theta_1}{\sin(180 - \theta_1 - \theta_2 - \Delta\theta)} - \frac{D \sin \theta_1}{\sin(180 - \theta_1 - \theta_2)} \quad \text{(Equ. 6)}$$

$$b' - b = \frac{D \sin(\theta_2 + \Delta\theta)}{\sin(180 - \theta_1 - \theta_2 - \Delta\theta)} - \frac{D \sin \theta_2}{\sin(180 - \theta_1 - \theta_2)} \quad \text{(Equ. 7)}$$

-continued $$\Delta L = D\left[\frac{\sin\theta_1 + \sin(\theta_2 + \Delta\theta)}{\sin(180 - \theta_1 - \theta_2 - \Delta\theta)} - \frac{(\sin\theta_1 + \sin\theta_2)}{\sin(180 - \theta_1 - \theta_2)}\right] \quad \text{(Equ. 8)}$$

The differential time delay therefore given by:

$$T = \frac{L}{c} \quad \text{(Equ. 9)}$$

where $c$ is the speed of light. In one operative embodiment, where $\theta_1 = 10°$ and $\theta_2 = 10°$ and in which the entire field of view is 20° broken up into ten 2° segments and where in the distance between transmitter and receiver is 20 miles then the delays as calculated by the above formula are given in Table I.

TABLE I

| Field-of-View Boresight Angles | | |
|---|---|---|
| 10° – 12° | $d_1$ 1-2 | = .336 μ sec. |
| 12° – 14° | $d_2$ 2-3 | = .339 μ sec. |
| 14° – 16° | $d_3$ 3-4 | = .341 μ sec. |
| 16° – 18° | $d_4$ 4-5 | = .344 μ sec. |
| 18° – 20° | $d_5$ 5-6 | = .347 μ sec. |
| 20° – 22° | $d_6$ 6-7 | = .350 μ sec. |
| 22° – 24° | $d_7$ 7-8 | = .354 μ sec. |
| 24° – 26° | $d_8$ 8-9 | = .358 μ sec. |
| 26° – 28° | $d_9$ 9-10 | = .362 μ sec. |

For this system, the bandwidth is equal to $$\frac{1}{2 \times \text{a maximum inter-pulse}}$$

spacing which is equal to $$\frac{1}{2 \times .362 \text{ microseconds}}$$

Figure 6:
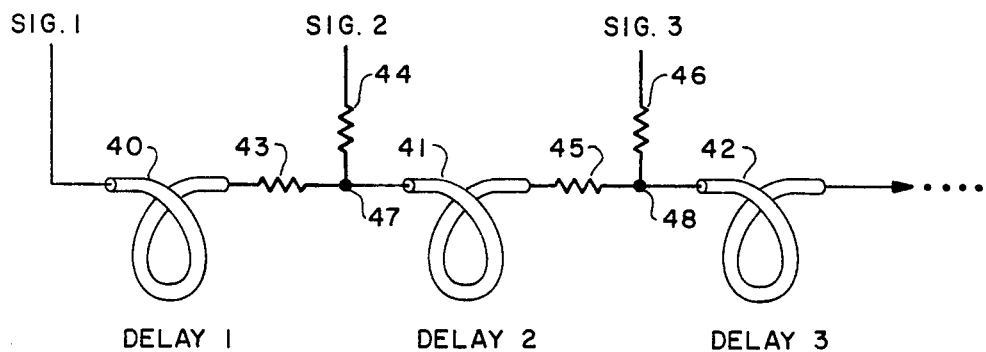
FIG. 6 is a diagramatic and schematic illustration of a co-axial delay line for use with one type of multi-segment receiver.

Referring now to FIG. 6, in order to obtain very short signal delays a coaxial delay line including coaxial segments 40, 41, 42, etc., may be utilized for the delay line 30 of FIG. 2. Resistors 43–46 etc. match the input signal to the impedance of the delay line at summation points 47 and 48 etc. The delay is, of course, set by the coax length between points 47 and 48.

Figure 7:
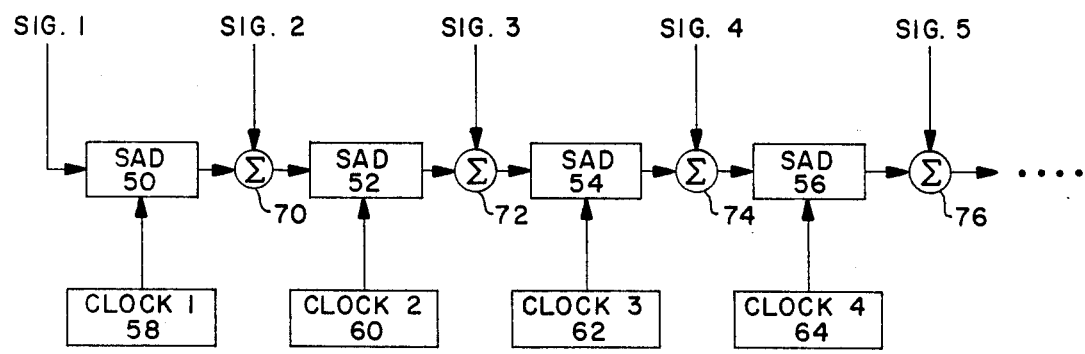
FIG. 7 is a block schematic diagram of a serial analog line in which the delays are adjusted according to the clock frequency applied to the individual units which make up the delay line.

Referring now to FIG. 7, a serial analog delay line is shown in which the delays are set by the clocking rate of the individual serial analog delay units 50, 52, 54, 56 etc., which are clocked respectively by clocks 58, 60, 62, 64 etc. The input signal to SAD 50 is the $FOV_1$ signal input from the $FOV_1$ preamplifier of FIG. 2. The output of SAD 50 is summed with the $FOV_2$ signal at summation device 70 and the result is thereafter applied as an input to SAD 52. The output of SAD 52 is summed with the $FOV_3$ signal at 72, the output of SAD 54 is summed with the $FOV_4$ signal at summation device 74, and the output of SAD 56 is summed with the $FOV_5$ signal at summation device 76 etc.

The SAD units are commercially available as Model SAD 100 units, manufactured by the Reticon Corporation of Sunnyvale, Cal., with the delay per section equal to $100 \div f_{clock}$.

For a $\Delta L$ equal to 12,500 feet, the delay between successive fields of view is approximately 10 microseconds and therefore a 10 megahertz clock may be utilized. For shorter delays, the aforementioned coaxial delay line will be adequate.

What has therefore been described is an inverse optical delay to provide the compensation necessary in forward scatter communication links. Not only does the subject system compensate for pulse stretching or smearing, but also the signal-to-noise ratio is considerably enhanced. In general, this is accomplished by a method for compensating multi-path distortion including means at one location for projecting an optical beam modulated in accordance with intelligence to be transmitted in a predetermined direction and receiver means at another location for detecting signals scattered towards the receiver by different successive sections along the beam, in which the receiver inverts the order of the signals to provide a series of signals inverted in time with respect to their original arrival times at the receiver. Means are then provided for delaying one signal in the series with respect to the next succeeding signal by an amount which compensates for path length difference between the path from the projecting means to the receiver via the different corresponding beam sections and for adding the delayed signals and the next succeeding signals together to obtain a composite signal. Alternatively, the invention may be viewed as one in which the time delays are such as to cause the signals in the series to coherently add. Another way of describing the delay is that it is such that the delayed preceding signal is time coincident with the next succeeding signal.

Although preferred embodiments of the invention have been described in considerable detail for illustrative purposes, many modifications will occur to those skilled in the art. It is therefore desired that the protection afforded by Letters Patent be limited only by the true scope of the appended claims.

I claim:

1. An optical forwards scatter communications system which provides pulse elongation compensation comprising:
   means at one location for projecting a single optical beam modulated in accordance with intelligence to be transmitted in a predetermined direction, and
   means at another location for optically defining successive sections along said single beam, and for detecting signals scattered towards said receiver means by said different sections, for inverting the order of said signals to provide a series of signals inverted in time of arrival with respect to the original times of arrival at said detecting means, for delaying one signal in said series with respect to the next succeeding signal by an amount which compensates for the pathlength difference between the path from said projecting means to said receiver means via the different corresponding successive beam sections, and for adding the delayed signal and said next succeeding signals together to obtain a composite signal.

2. The system of claim 1 wherein said detecting means includes a segmented detector with said segments arranged in said predetermined direction and wherein said inverting means includes means for focusing said successive sections of said beam onto said segmented detector, thereby to provide said receiver means with multiple fields of view.

3. The system of claim 1 wherein each of said segments produces an output signal for light focused thereon by said focusing means and wherein said delay and adding means includes a tapped electrical delay line.

4. The system of claim 3 wherein said tapped electrical delay line includes segments of coaxial cable, the length of which determines the delay between taps.

5. The system of claim 1 wherein said delay means includes serially connected serial analog delay units, and clock means for each of said units, the frequency of said clock means determining the delay associated with a corresponding serial analog delay unit.

6. The system of claim 1 wherein said segmented detector includes a number of light pipes, and detectors at the ends of the light pipes, with the other ends of the light pipes being arranged in said predetermined direction at the focal plane of said focusing means.

7. An optical forward scatter communications system which provides pulse elongation compensation, comprising:
   means at one location for projecting an optical beam modulated in accordance with intelligence to be transmitted,
   means at another location for detecting signals scattered from different successive sections along said beam and for inverting their order to provide series of signals inverted in time of arrival with respect to their original times of arrival at said detecting means, and,
   means for delaying a preceding signal in said series with respect to a next succeeding signal by amounts which cause the signals in said series to coherently add, and for adding the coherently addable signals together to obtain a composite signal.

8. An optical forward scatter communications system which provides pulse elongation compensation, comprising:
   means at one location for projecting an optical beam modulated in accordance with intelligence to be transmitted,
   means at another location for detecting signals scattered from different successive sections along said beam and for inverting their order to provide a series of signals inverted in time of arrival with respect to their original times of arrival at said detecting means, and,
   means for delaying a preceding signal in said series so that it coincides in time with the next succeeding signal and for adding said time coincident signals to obtain a composite signal.

9. A method for compensating for multi-path distortion in an optical forward scatter system utilizing the projection of a beam in a predetermined direction through the earth's atmosphere from one location and a receiver at another location for detecting radiation scattered from said beam to said receiver comprising the steps of:
   providing an inverse optical path at said receiver for radiation scattered thereto from said beam,
   delaying signals at various successive sections along said inverse optical path with respect to next succeeding sections by amounts which cause signals in adjacent sections to coherently add, and
   adding said coherently addable signals, whereby path length differences from the projection location to the reception location due to scattering from different points along the beam are compensated for by the delay and coherent addition.

10. A method for providing multi-path distortion compensation for an optical forward scatter communications system in which means are provided at one location for projecting an optical beam modulated in accordance with intelligence to be transmitted, comprising the steps of:

- detecting signals scattered from different successive sections along said beam at another location, and inverting their order to provide series of signals inverted in time of arrival, and,
- delaying a preceding signal in said series so that it coincides in time with the next succeeding signal and adding the time coincident signals to obtain a composite signal.

11. Apparatus for providing multi-path distortion compensation for an optical forward scatter communications system in which means are provided at one location for projecting an optical beam modulated in accordance with intelligence to be transmitted, comprising;

- means for detecting signals scattered from different successive sections along said beam at another location, and inverting their order to provide series of signals inverted in time of arrival, and,
- means for delaying a preceding signal in said series so that it coincides in time with the next succeeding signal and adding the time coincident signals to obtain a composite signal.

* * * * *